(12) United States Patent
Moroga et al.

(10) Patent No.: US 10,637,532 B2
(45) Date of Patent: Apr. 28, 2020

(54) RADIO BASE STATION, USER TERMINAL AND RADIO COMMUNICATION METHOD

(71) Applicant: NTT DOCOMO, INC., Tokyo (JP)

(72) Inventors: Hideyuki Moroga, Tokyo (JP); Kazuaki Takeda, Tokyo (JP); Shimpei Yasukawa, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 47 days.

(21) Appl. No.: 15/543,591

(22) PCT Filed: Jan. 29, 2016

(86) PCT No.: PCT/JP2016/052611
§ 371 (c)(1),
(2) Date: Jul. 14, 2017

(87) PCT Pub. No.: WO2016/121911
PCT Pub. Date: Aug. 4, 2016

(65) Prior Publication Data
US 2017/0373715 A1    Dec. 28, 2017

(30) Foreign Application Priority Data

Jan. 29, 2015 (JP) ................. 2015-015794

(51) Int. Cl.
*H04B 1/713* (2011.01)
*H04L 1/00* (2006.01)
(Continued)

(52) U.S. Cl.
CPC ............. *H04B 1/713* (2013.01); *H04J 11/00* (2013.01); *H04L 1/0001* (2013.01); *H04L 1/04* (2013.01);
(Continued)

(58) Field of Classification Search
CPC combination set(s) only.
See application file for complete search history.

(56) References Cited

U.S. PATENT DOCUMENTS

2009/0316811 A1* 12/2009 Maeda ................. H04W 76/11
375/260
2011/0085516 A1* 4/2011 Pajukoski ............... H04L 5/001
370/330
(Continued)

FOREIGN PATENT DOCUMENTS

JP        2011166650 A     8/2011

OTHER PUBLICATIONS

Office Action issued in corresponding Japanese Application No. 2016-572170, dated Dec. 19, 2017 (8 pages).
(Continued)

*Primary Examiner* — Wutchung Chu
*Assistant Examiner* — Syed Ali
(74) *Attorney, Agent, or Firm* — Osha Liang LLP

(57) ABSTRACT

The present invention is designed so that the decrease of spectral efficiency can be reduced even when coverage enhancement is attempted in communication by user terminals in which the bandwidth to use is limited to partial reduced bandwidths in a system bandwidth. A radio base station communicates with a user terminal in which the bandwidth to use is limited to partial reduced bandwidths in a system bandwidth, and this radio base station has a transmission section that transmits a downlink signal to the user terminal in repetitions, and a control section that controls transmission by applying a transmission method to use frequency hopping or a transmission method to use frequency scheduling to the downlink signal, and the trans-
(Continued)

mission section transmits information about the transmission method to apply to the downlink signal to the user terminal.

10 Claims, 13 Drawing Sheets

(51) Int. Cl.
  *H04W 72/12* (2009.01)
  *H04W 72/04* (2009.01)
  *H04L 5/00* (2006.01)
  *H04J 11/00* (2006.01)
  *H04W 28/04* (2009.01)
  *H04L 1/04* (2006.01)
  *H04W 4/70* (2018.01)

(52) U.S. Cl.
  CPC .......... *H04L 5/0012* (2013.01); *H04L 5/0053* (2013.01); *H04W 28/04* (2013.01); *H04W 72/04* (2013.01); *H04W 72/0453* (2013.01); *H04W 72/12* (2013.01); *H04W 72/1278* (2013.01); *H04W 72/1289* (2013.01); *H04L 5/0007* (2013.01); *H04L 5/0064* (2013.01); *H04W 4/70* (2018.02)

(56) References Cited

U.S. PATENT DOCUMENTS

| | | | | |
|---|---|---|---|---|
| 2012/0207040 A1* | 8/2012 | Comsa | .............. | H04W 72/1215 370/252 |
| 2015/0131566 A1* | 5/2015 | Seo | ...................... | H04B 1/3838 370/329 |
| 2015/0282068 A1* | 10/2015 | Rajagopal | ......... | H04W 52/0206 370/350 |
| 2016/0205671 A1* | 7/2016 | Tabet | .................. | H04W 72/042 370/329 |
| 2017/0078830 A1* | 3/2017 | Wu | ......................... | H04W 4/70 |
| 2017/0295570 A1* | 10/2017 | Awad | ................ | H04W 72/0446 |
| 2018/0254860 A1* | 9/2018 | Wong | .................... | H04L 1/1819 |
| 2018/0286213 A1* | 10/2018 | Schueler | ........... | H04W 52/0216 |

OTHER PUBLICATIONS

Extended European Search Report issued in the counterpart European Patent Application No. 16743514.8, dated Aug. 21, 2018 (11 pages).
CATT; "Discussion on UE RF bandwidth reduction"; 3GPP TSG RAN WG1 Meeting #79 R1-144618; San Francisco, USA, Nov. 17-21, 2014 (2 pages).
International Search Report issued in corresponding application No. PCT/JP2016/052611 dated Apr. 12, 2016 (4 pages).
Written Opinion of the International Searching Authority issued in corresponding application No. PCT/JP2016/052611 dated Apr. 12, 2016 (4 pages).
NTT Docomo, "Initial Views on UE Complexity Reduction in Rel-13 Low Cost MTC"; 3GPP TSG RAN WG1 Meeting #78bis, R1-144146; Ljubljana, Slovenia; Oct. 6-10, 2014 (3 pages).
NTT Docomo, "Views on PDSCH Coverage Enhancement"; 3GPP TSG RAN WG1 Meeting #75, R1-135511; San Francisco, USA; Nov. 11-15, 2013 (4 pages).
ZTE, "Discussion on Physical data channels and associated physical control channels for MTC enhancement"; 3GPP TSG RAN WG1 Meeting #78bis, R1-143808; Ljubljana, Slovenia; Oct. 6-10, 2014 (5 pages).
3GPP TS 36.300 V8.5.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; May 2008 (134 pages).
3GPP TR 36.888 V12.0.0, "3rd Generation Partnership Project; Technical Specification Group Radio Access Network; Study on provision of low-cost Machine-Type Communications (MTC) User Equipments (UEs) based on LTE (Release 12)"; Jun. 2013 (55 pages).

* cited by examiner

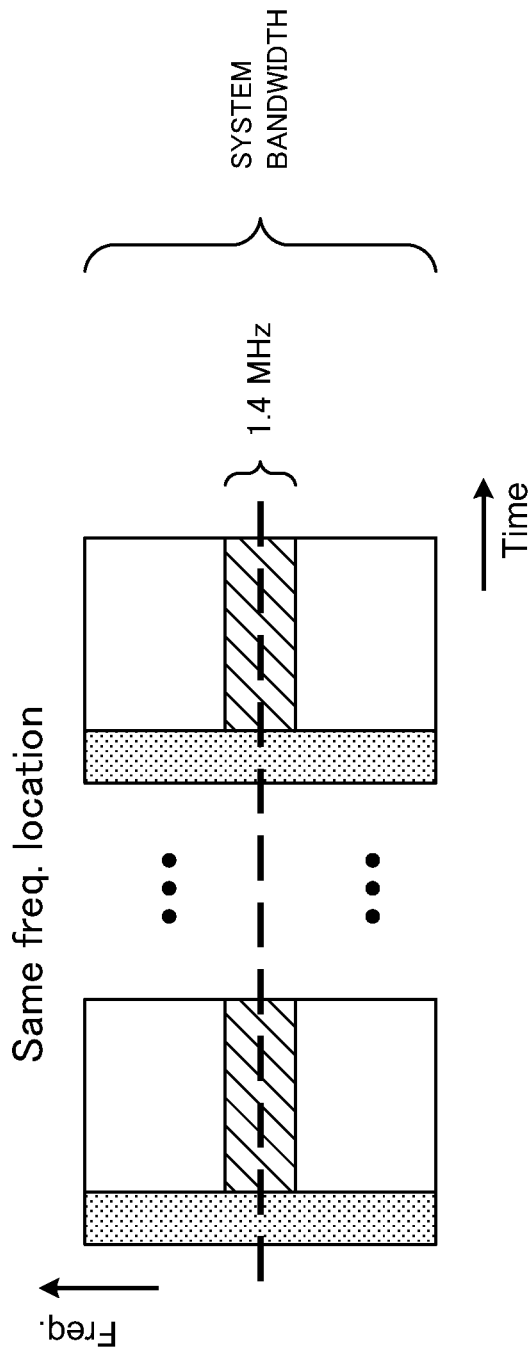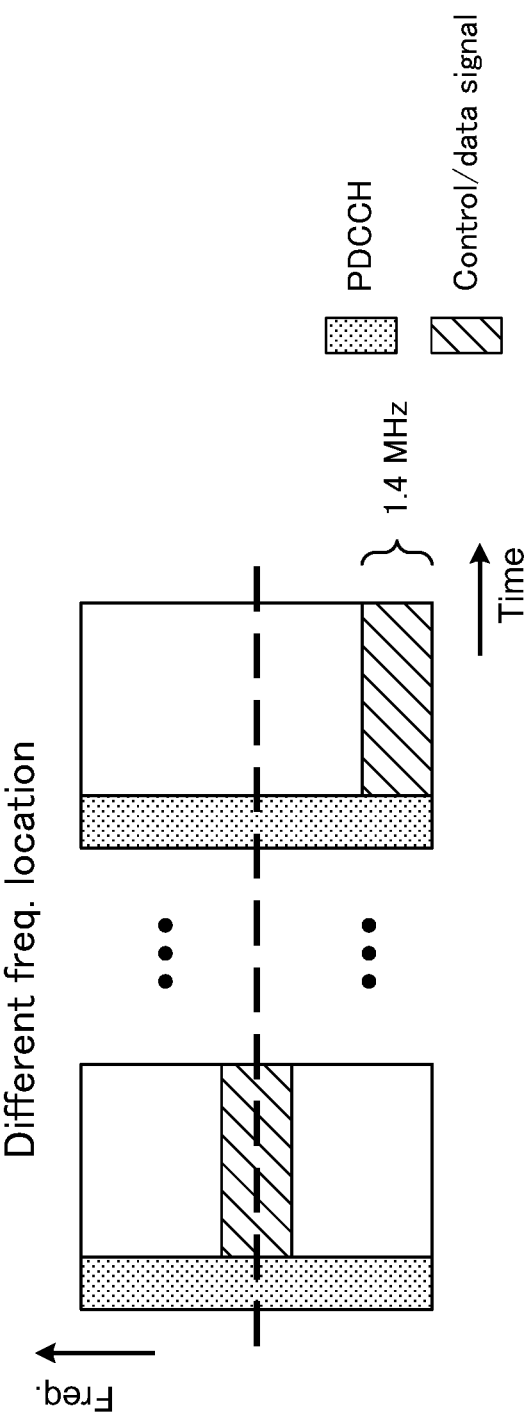

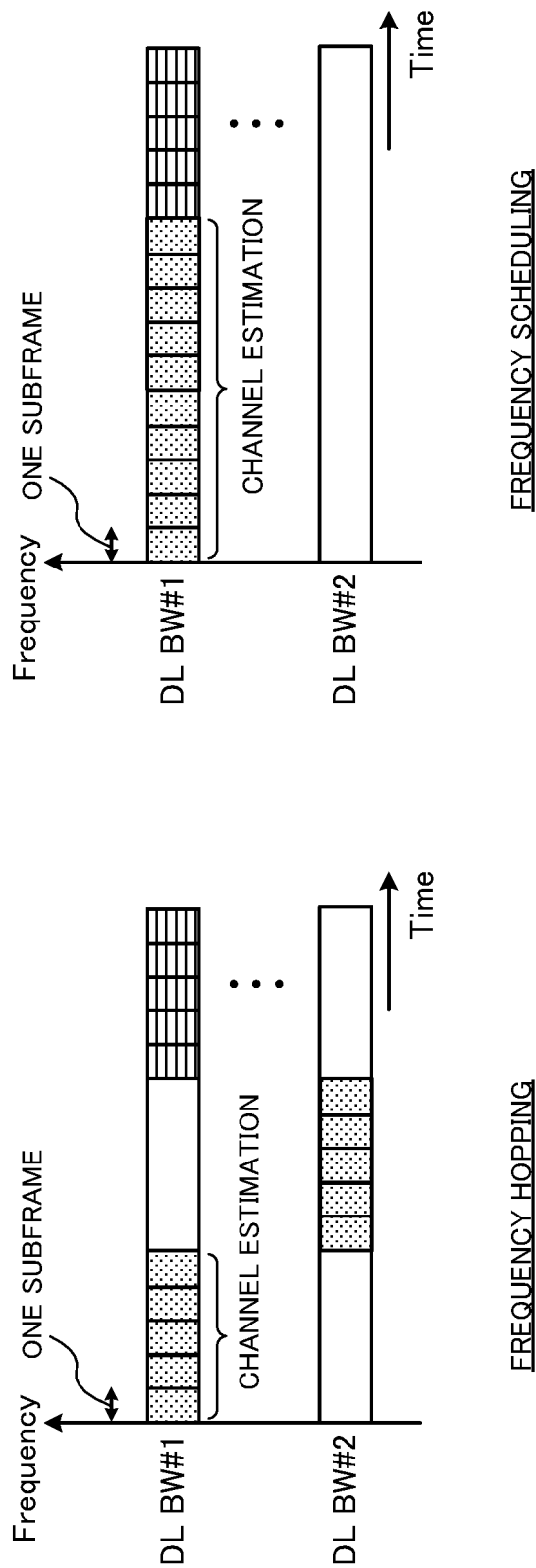

FIG. 7A

| REPETITION FACTOR | |
|---|---|
| 10 OR HIGHER | LESS THAN 10 |
| FREQUENCY HOPPING | FREQUENCY SCHEDULING |

FIG. 7B

| MCS | |
|---|---|
| MCS#0 | MCS#1 OR HIGHER |
| FREQUENCY HOPPING | FREQUENCY SCHEDULING |

FIG. 7C

| CQI, RSRP, RSRQ | |
|---|---|
| PREDETERMINED VALUE OR GREATER | LESS THAN PREDETERMINED VALUE |
| FREQUENCY SCHEDULING | FREQUENCY HOPPING |

RADIO BASE STATION, USER TERMINAL AND RADIO COMMUNICATION METHOD

TECHNICAL FIELD

The present invention relates to a radio base station, a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1). Also, successor systems of LTE (also referred to as, for example, "LTE-advanced" (hereinafter referred to as "LTE-A"), "FRA" (Future Radio Access) and so on) are under study for the purpose of achieving further broadbandization and increased speed beyond LTE.

Now, accompanying the cost reduction of communication devices in recent years, active development is in progress in the field of technology related to machine-to-machine communication (M2M) to implement automatic control of network-connected devices and allow these devices to communicate with each other without involving people. In particular, of all M2M, 3GPP (3rd Generation Partnership Project) is promoting standardization with respect to the optimization of MTC (Machine-Type Communication), as a cellular system for machine-to-machine communication (see non-patent literature 2). MTC terminals are being studied for use in a wide range of fields, such as, for example, electric meters, gas meters, vending machines, vehicles and other industrial equipment.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"
Non-Patent Literature 2: 3GPP TS 36.888 "Study on provision of low-cost Machine-Type Communications (MTC) User Equipments (UEs) based on LTE (Release 12)"

SUMMARY OF INVENTION

Technical Problem

From the perspective of reducing the cost and improving the coverage area in cellular systems, amongst all MTC terminals, low-cost MTC terminals (low-cost MTC UEs) have been increasingly in demand. Low-cost MTC terminals can be implemented by limiting the bandwidth to use in the uplink (UL) and the downlink (DL) to a portion (one component carrier, for example) of a system bandwidth.

When the bandwidth to use is limited to a portion of a system bandwidth (for example, to a frequency bandwidth of 1.4 MHz), the receiving performance deteriorates. Furthermore, a study is in progress to apply coverage enhancement to MTC terminals. It may be possible to apply the method of repetitious transmission (repetition), which improves the received-signal-to-interference/noise ratio (SINR: Signal-to-Interference plus Noise Ratio) by repeating transmitting the same signal over multiple subframes in the downlink (DL) and/or the uplink (UL), as a method of achieving improved receiving performance and enhanced coverage in MTC terminals.

However, when repetition is employed by using only partial frequency bandwidths in a system bandwidth, the repetition factor for achieving desired performance may increase depending on the communicating environment and/or others, and therefore there is a threat that the spectral efficiency might decrease.

The present invention has been made in view of the above, and it is therefore an object of the present invention to provide a radio base station, a user terminal and a radio communication method that can reduce the decrease of spectral efficiency even when coverage enhancement is attempted in user terminal communication in which the bandwidth to use is limited to partial reduced bandwidths in a system bandwidth.

Solution to Problem

One aspect of the present invention provides a radio base station that communicates with a user terminal in which the bandwidth to use is limited to partial reduced bandwidths in a system bandwidth, and this radio base station has a transmission section that transmits a downlink signal to the user terminal in repetitions, and a control section that controls transmission by applying a transmission method to use frequency hopping or a transmission method to use frequency scheduling to the downlink signal, and the transmission section transmits information about the transmission method to apply to the downlink signal to the user terminal.

Advantageous Effects of Invention

According to the present invention, it is possible to reduce the decrease of spectral efficiency even when coverage enhancement is attempted in user terminal communication in which the bandwidth to use is limited to partial reduced bandwidths in a system bandwidth.

BRIEF DESCRIPTION OF DRAWINGS

FIG. 1 provide diagrams, each showing an example of the arrangement of reduced bandwidths in a downlink system bandwidth;
FIG. 4 provide diagrams to show other examples of the method of channel estimation for use when frequency hopping and frequency scheduling are applied;
FIG. 7 provide diagrams to show examples of tables in which predetermined conditions and transmission methods are associated with each other and stipulated.

DESCRIPTION OF EMBODIMENTS

Figure 2B:
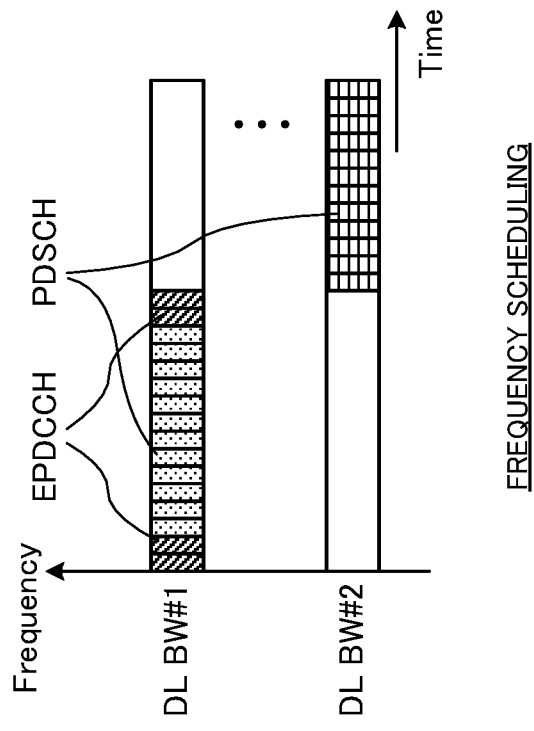
FIG. 2 provide diagrams to show examples of frequency hopping and frequency scheduling methods.

A study in progress to limit the processing capabilities of terminals by making the peak rate low, limiting the resource blocks, allowing limited RF reception and so on, in order to reduce the cost of MTC terminals. For example, the maximum transport block size in unicast transmission using a downlink data channel (PDSCH: Physical Downlink Shared Channel) is limited to 1000 bits, and the maximum transport block size in BCCH transmission using a downlink data channel is limited to 2216 bits. Furthermore, the downlink data channel bandwidth is limited to 6 resource blocks (also referred to as "RBs" (Resource Blocks), "PRBs" (Physical Resource Blocks), etc.). Furthermore, the RFs to receive in MTC terminals are limited to one.

The transport block size and the resource blocks in low-cost MTC terminals (low-cost MTC UEs) are more limited than in existing user terminals, and therefore low-cost MTC terminals cannot connect with cells in compliance with LTE Rel. 8 to 11. Consequently, low-cost MTC terminals connect only with cells where a permission of access is reported to the low-cost MTC terminals in broadcast signals. Furthermore, a study is in progress to limit not only downlink data signals, but also various control signals that are transmitted on the downlink (such as system information, downlink control information and so on), data signals and various control signals that are transmitted on the uplink and so on, to predetermined reduced bandwidths (for example, 1.4 MHz).

Such band-limited MTC terminals need to be operated in the LTE system bandwidth, considering the relationship with existing user terminals. For example, it might occur that frequency-multiplexing of band-limited MTC terminals and band-unlimited existing user terminals may be supported in a system bandwidth. Furthermore, band-limited user terminals may only support predetermined reduced-bandwidth RFs in the uplink and the downlink. Here, MTC terminals refer to terminals that support only partial reduced bandwidths in a system bandwidth as the maximum bandwidth they can support, and existing user terminals refer to terminals that support the system bandwidth (for example, 20 MHz) as the maximum bandwidth they can support.

That is, the upper limit bandwidth for use for MTC terminals is limited to predetermined reduced bandwidths, while, in existing user terminals, the system bandwidth is configured as the upper limit of the bandwidth to use. MTC terminals are designed presuming reduced bandwidths, and therefore the hardware structure is simplified, and their processing capabilities are low compared to existing user terminals. Note that MTC terminal may be referred to as "low-cost MTC terminals" (LC-MTC UEs), "MTC UEs" and so on. Existing user terminals may be referred to as "normal UEs," "non-MTC UEs," category 1 UEs" and so on.

Now, a study is in progress to apply coverage enhancement to wireless communication with MTC terminals. For example, for MTC terminals, coverage enhancement of maximum 15 dB is under study, in comparison to existing category-1 user terminals (category-1 UEs).

As for the method of coverage enhancement in wireless communication by MTC terminals, repetition, which refers to transmitting the same signal in repetitions in the downlink (DL) and/or the uplink (UL), may be employed. However, depending on the environment in which communication takes place, the repetition factor for achieving desired coverage performance (for example, coverage of maximum 15 dB) increases, and therefore the spectral efficiency might decrease.

FIG. 1 show the method of arranging reduced bandwidths in a downlink system bandwidth. As mentioned earlier, MTC terminals only support predetermined (for example, 1.4-MHz) reduced bandwidths, and therefore cannot detect downlink control information (DCI) that is transmitted in a wide-bandwidth PDCCH. So, it may be possible to allocate downlink (PDSCH) and uplink (PUSCH: Physical Uplink Shared Channel) resources to MTC terminals by using an EPDCCH (Enhanced Physical Downlink Control Channel).

FIG. 1A shows a case where the bandwidth for use for MTC terminals is limited to a partial reduced bandwidth (for example, 1.4 MHz) in a system bandwidth, and where this reduced bandwidth is arranged in a predetermined, fixed frequency location in the system bandwidth. In this case, MTC terminals have to implement repetition by using only a portion of the system bandwidth, and therefore a frequency diversity effect cannot be achieved, and the spectral efficiency might decrease. On the other hand, referring to FIG. 1B, when a reduced bandwidth that constitutes the bandwidth for use changes its frequency location in every subframe, a frequency diversity effect can be achieved, and the decrease of spectral efficiency can be reduced.

So, the present inventors have found that it is possible to reduce the repetition factor and improve the spectral efficiency by applying frequency hopping, frequency scheduling and so on, instead of configuring reduced bandwidths for use for MTC terminals in frequency locations.

Figure 2A:
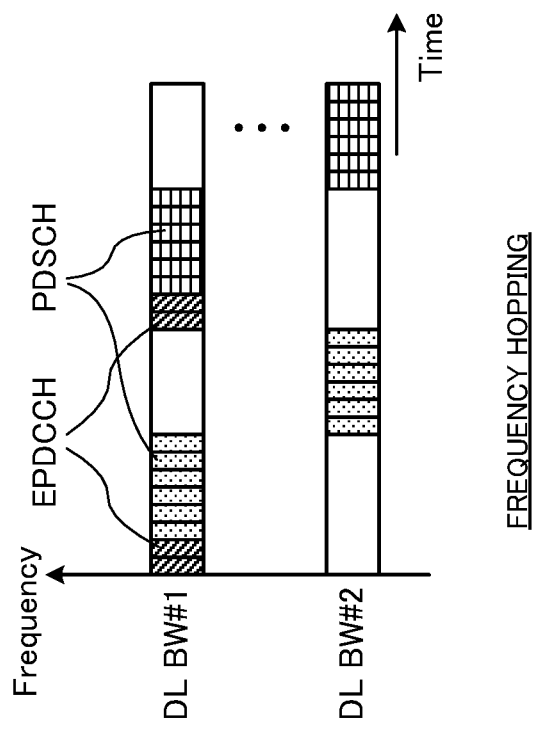

FIG. 2A is a diagram to show an example of the case where a radio base station transmits downlink signals (for example, EPDCCH and/or PDSCH) to an MTC terminal by using frequency hopping. In the case illustrated in FIG. 2A, the radio base station transmits downlink signals to an MTC terminal by using frequency hopping between a first reduced bandwidth (DL BW #1) and a second reduced bandwidth (DL BW #2) in a system bandwidth.

Although, in this illustrated case, an enhanced downlink control channel (EPDCCH) for transmitting downlink control information (DCI) is allocated to the same frequency location (here, DL BW #1), and frequency hopping is applied to a PDSCH, which is for transmitting downlink data, this is by no means limiting. Frequency hopping may be applied to the EPDCCH as well.

FIG. 2B is a diagram to show an example of the case where a radio base station transmits downlink signals (for example, EPDCCH and/or PDSCH) to an MTC terminal by using frequency scheduling. In the case illustrated in FIG. 2B, the radio base station allocates downlink signals to either the first reduced bandwidth (DL BW #1) or the second reduced bandwidth (DL BW #2) based on downlink channel quality and so on, and transmits these signals.

Although, in this illustrated case, an enhanced downlink control channel (EPDCCH) is allocated to the same frequency area (here, DL BW #1) and frequency scheduling is applied to a PDSCH, this is by no means limiting.

In this way, when applying repetition to wireless communication by MTC terminals, by applying frequency hopping or frequency scheduling, it is possible to combine signals among multiple subframes and achieve an frequency diversity effect. By this means, it is possible to achieve improved receiving performance in comparison to the case of fixing the frequency locations of reduced bandwidths for use for MTC terminals.

Furthermore, the present inventors have focused on the point that the accuracy of channel estimation improves better when the number of subframes to combine is greater, and studied the relationship between the repetition factor and frequency hopping/frequency scheduling.

Figures 3A, 3B:
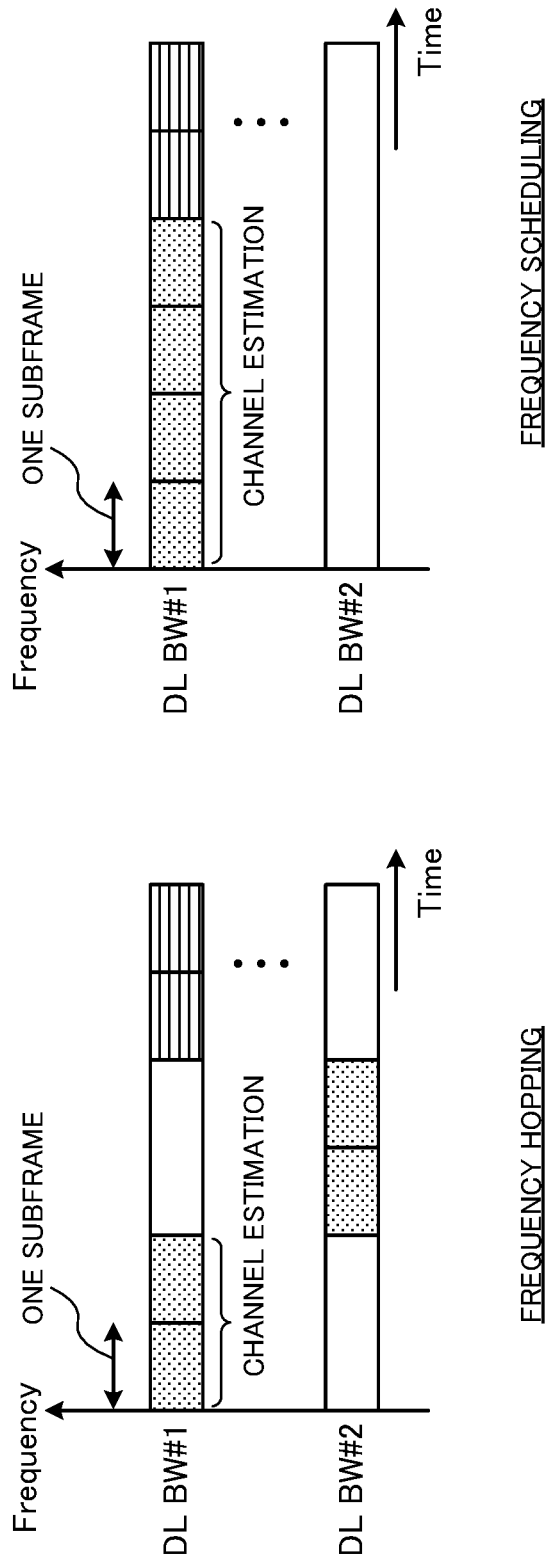
FIG. 3 provide diagrams to show examples of the method of channel estimation for use when frequency hopping and frequency scheduling are applied.

First, assume the case where the repetition factor is small. In this case, if a radio base station transmits downlink signals by using frequency hopping, the number of the number of combined subframes that an MTC terminal can use for channel estimation becomes smaller (see FIG. 3A). FIG. 3A shows a case where frequency hopping is applied between the first reduced bandwidth (DL BW #1) and the second reduced bandwidth (DL BW #2) when the repetition factor is 4. In this case, the number of combined subframes which an MTC terminal can use for channel estimation is 2, and therefore the accuracy of channel estimation is likely to deteriorate.

On the other hand, when the radio base station transmits downlink signals by using frequency scheduling, a downlink signal that is subject to repetitious transmission is transmitted in a reduced bandwidth (here, DL BW #1) where good channel states are shown (see FIG. 3B). FIG. 3B shows a case where a downlink signal is allocated to the first reduced bandwidth (DL BW #1) by frequency scheduling when the repetition factor is 4. In this case, an MTC terminal can achieve scheduling gain, and, furthermore, improve the accuracy of channel estimation.

Consequently, when the repetition factor is small, applying frequency scheduling is more preferable than applying frequency hopping. Note that, when using frequency scheduling, channel quality measurements (for example, CSI measurements) for a plurality of frequency resources become necessary.

Next, assume the case where the repetition factor is large. Even when a radio base station transmits downlink signals by using frequency hopping, it is still possible to secure a sufficient number of combined subframes which an MTC terminal can use for channel estimation (see FIG. 4A). FIG. 4A shows a case where frequency hopping is applied between the first reduced bandwidth (DL BW #1) and the second reduced bandwidth (DL BW #2) when the repetition factor is 10. In this case, the number of combined subframes which an MTC terminal can use for channel estimation is 5, so that it is possible to achieve a sufficient level of accuracy with channel estimation, and achieve frequency diversity gain.

On the other hand, when the radio base station transmits downlink signals by using frequency scheduling, a downlink signal that is subject to repetitious transmission is transmitted in a reduced bandwidth (here, DL BW #1) where good channel states are shown (see FIG. 4B). FIG. 4B shows a case where a downlink signal is allocated to the first reduced bandwidth (DL BW #1) by frequency scheduling when the repetition factor is 10. In this case, as in the case the repetition factor is small, an MTC terminal can achieve scheduling gain, and, furthermore, improve the accuracy of channel estimation.

Consequently, when the repetition factor is large, it is preferable to apply one of frequency hopping and frequency scheduling. Note that, when using frequency scheduling, channel quality measurements (for example, CSI measurements) for a plurality of frequency resources become necessary.

Figure 5:
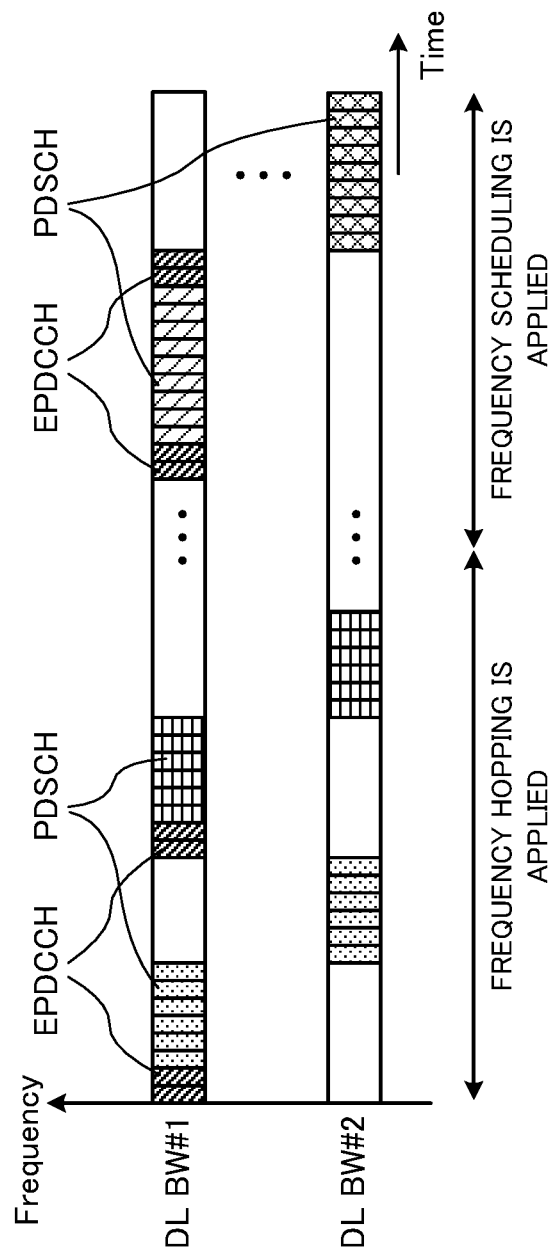
FIG. 5 is a diagram to show an example of the case where frequency hopping and frequency scheduling methods are switched and controlled.

In this way, the present inventors have come up with the idea that, when using a wireless communication method for MTC terminals, it is effective to switch and control the transmission method based on the conditions of communication (for example, the repetition factor, and/or others), the communicating environment (received quality, the situation of traffic, etc.) and so ono (see FIG. 5).

Meanwhile, when switching and controlling the transmission method, an MTC terminal has to know, correctly, what transmission method (frequency hopping or frequency scheduling) is applied to DL communication and/or UL communication. So, the present inventors have come up with the idea that, even when a plurality of transmission methods are used in wireless communication by MTC terminals, it is possible to transmit information related to these transmission methods can to the MTC terminals and enable these MTC terminals to receive signals properly.

Now, embodiments of the present invention will be described below. Although MTC terminals will be shown as an example of user terminals in which the bandwidth to use is limited to reduced bandwidths, the application of the present invention is not limited to MTC terminals. Furthermore, although 6-PRB (1.4-MHz) reduced bandwidths will be described below, the present invention can be applied to other reduced bandwidths as well, based on the present description.

Furthermore, although cases will be shown in the following description where the embodiments herein are applied to DL signals (for example, the PDSCH) transmitted from a radio base station to an MTC terminal, it is equally possible to apply the embodiments herein to UL signals that are transmitted from an MTC terminal to a radio base station (for example, the PUSCH). Furthermore, the signals (channels) to which the embodiments herein can be applied are not limited to data signals (the PDSCH, the PUSCH, etc.), and control signals (for example, the EPDCCH) and reference signals (for example, the CSI-RS, the CRS, the DMRS, the SRS, etc.) are equally applicable.

First Example

A case will be describe with a first example where a radio base station explicitly reports the transmission method to apply to DL signals and/or UL signals per MTC terminal or per cell (explicit signaling).

<Configuration Per MTC Terminal>

A radio base station can configure the transmission method for DL signals and/or UL signals (frequency hopping or frequency scheduling) per MTC terminal, separately. For example, the radio base station can decide whether to apply frequency hopping or frequency scheduling, on a per MTC terminal basis, based on predetermined conditions such as the conditions of communication, the communicating environment and so on.

When configuring transmission methods on a per MTC terminal basis, the radio base station can report information about the transmission method to each MTC terminal by using downlink control information (DCI) that is transmitted in an enhance control channel (EPDCCH). By reporting transmission methods to MTC terminals by using downlink control information, it is possible to control the switching of transmission methods (for example, frequency hopping or frequency scheduling) dynamically.

In this case, the radio base station can transmit the transmission method-related information by using an existing bit field in downlink control information. For example, among the existing bit fields included in DCI, the radio base station can transmit a bit field that is not used in wireless communication with MTC terminals (for example, the "localized/distributed VRB assignment flag" field). Alternatively, the radio base station may provide a new bit field for identifying the transmission method in DCI. In this case, the new bit field can be one bit (specifying one transmission method) or two bits (specifying the UL transmission method and the DL transmission method).

Furthermore, the radio base station can configure/report the transmission methods to each MTC terminal by using higher layer signaling. When information about transmission methods is reported by using higher layer signaling (for example, RRC signaling), it is possible to control the switching between frequency hopping and frequency scheduling semi-statically.

Furthermore, when a plurality of reduced bandwidths are configured in an MTC terminal, the radio base station can report information about the transmission method to apply to DL signals and/or UL signals in each reduced bandwidth by using higher layer signaling (for example, RRC signaling and so on), and report the allocation of resources by using a downlink control signal. For example, when an MTC terminal supports four reduced bandwidths, the radio base station applies frequency hopping to two reduced bandwidths and frequency scheduling to the other two reduced bandwidths, and reports to the MTC terminal which transmission method is applied, by using higher layer signaling. Furthermore, the radio base station indicates the allocation of data signal by using downlink control information. Note that the communication methods to apply to each reduced bandwidth may be fixed, may be changed on a per MTC terminal basis, or may be changed, in one MTC terminal, depending on the situation of communication. When changing the communication methods to apply to each reduced bandwidth, the radio base station can report the changes of the communication methods to apply to each reduced bandwidth in higher layer signaling and/or the like. Furthermore, when there are a plurality of reduced bandwidths and only part of these reduced bandwidths are configured each MTC terminal, it is possible to combine information about the part of the reduced bandwidths and information about the communication methods to apply, and report this combination from the radio base station to the MTC terminals in higher layer signaling and/or the like.

<Configuration Per Cell>

A radio base station can configure a common transmission method for DL signals and/or UL signals (frequency hopping or frequency scheduling) for MTC terminals in the same cell. For example, a cell having a large cell radius (for example, a macro cell) anticipates a large repetition factor (the number of repetitions), and therefore frequency hopping, which is easy to control, can be applied. On the other hand, a cell having a small cell radius (for example, a small cell) anticipates a small repetition factor (the number of repetitions), and therefore frequency scheduling can be applied. Obviously, it is also possible to switch and control the transmission methods to apply to MTC terminal on a per cell basis.

The radio base station can place information about the transmission methods in broadcast information (MIB) and/or system information (SIB) and report this to MTC terminals in a cell. Alternatively, when a common search space (CSS) is configured in an enhanced downlink control channel (EPDCCH), the information about the transmission methods may be included in this CSS.

<Hopping Pattern>

When applying frequency hopping to DL signals and/or UL signals, the radio base station should preferably exert control to reduce the collisions of hopping patterns between MTC terminals where frequency hopping is selected.

Figure 6A:
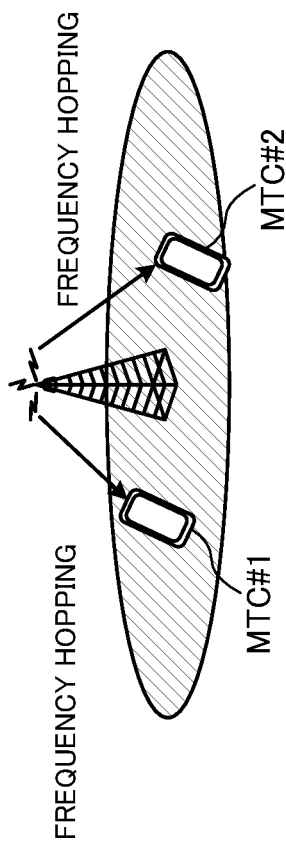
FIG. 6 provide diagrams to show an example of the case where the frequency hopping pattern is changed on a per MTC terminal basis.

For example, assume the case where the radio base station applies frequency hopping to two MTC terminals (here, MTC #1 and MTC #2) (see FIG. 6A). In this case, the radio base station can configure different hopping patterns between the carrying MTC terminals (see FIG. 6B).

Figure 6B:
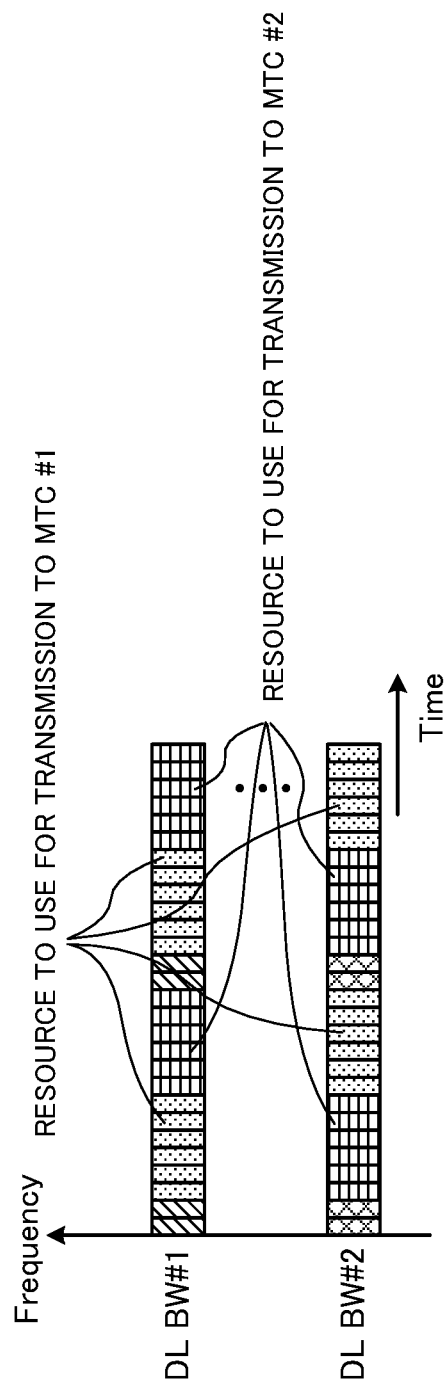

In the case illustrated in FIG. 6B, the radio base station configures different hopping patterns between MTC terminal #1 and MTC terminal #2 so as to prevent collisions of hopping patterns between MTC terminal #1 and MTC terminal #2. For example, it is possible to configure hopping patterns in association with each MTC terminal's identification information (also referred to as "user ID," "MTC ID," etc.). For example, it is possible to configure hopping pattern #0 in MTC terminals with odd-numbered identification information, and configure hopping pattern #1 in MTC terminals with even-numbered identification information.

FIG. 6B shows a case where two reduced bandwidths (DL BW #1 and DL BW #2) are configured in each MTC terminal, and where downlink signals that are transmitted to MTC terminal #1 and MTC terminal #2 in the same subframe are allocated to be frequency-division-multiplexed between the two reduced bandwidths. Note that the method shown in FIG. 6B by no means limits the hopping patterns that are applicable to the present embodiment. Furthermore, the number of reduced bandwidths to configure in each MTC terminal is not limited to two. It is equally possible to configure hopping patterns by using different reduced bandwidths among a plurality of MTC terminals where frequency hopping is applied.

The radio base station can report information about the frequency hopping patterns to each MTC terminal. The information about the frequency hopping patterns can be reported to each MTC terminal by using downlink control information, higher layer signaling and/or the like. Furthermore, it is also possible to combine the hopping pattern information with information about the transmission method (frequency hopping) and report this combination to MTC terminals. Alternatively, as mentioned earlier, it is possible to configure frequency hopping patterns in association with the MTC terminals' identification information, and allow the MTC terminals to determines the frequency hopping pattern autonomously.

In this way, when a plurality of MTC terminals employ frequency hopping, it is possible to reduce the collisions of hopping patterns by configuring different hopping patterns between the MTC terminals.

Note that, as for the transmission methods to apply to DL signals and UL signals (frequency hopping or frequency scheduling), according to the present embodiment, it is possible to configure a common transmission method or configure separate transmission methods. Alternatively, it is possible to configure a separate transmission method for each channel or signal to transmit, or configure a common transmission method. Furthermore, the radio base station may report information about the transmission method to apply to DL signals and the transmission method to apply to UL signals together, or separately, to user terminals.

Second Example

A case will be described with a second example where the transmission methods to apply to DL signals and/or UL signals are controlled based on predetermined conditions. To be more specific, a case will be described here in which information about the transmission methods to apply to DL signals and/or UL signals is implicitly reported from a radio base station to MTC terminals (implicit signaling), or in which MTC terminals determine these transmission methods autonomously.

<Repetition Factor>

In communication by MTC terminals, a radio base station and/or an MTC terminal can switch and control the transmission method (frequency hopping/frequency scheduling) depending on repetition factors. For example, a radio base station applies frequency hopping when the repetition factor for a DL signal is equal to or greater than a predetermined value (for example, 10), or applies frequency scheduling when the repetition factor for the DL signal is less than the predetermined value.

In this case, the radio base station can report information about the repetition factor for the DL signal (for example, the PDSCH) to an MTC terminal by using either broadcast information (MIB), system information (SIB), higher layer signaling (for example, RRC signaling) or downlink control information (DCI).

Based on the repetition factor-related information reported from the radio base station thus, the MTC terminal can learn the transmission methods applied to DL signals and/or UL signals. In this case, it is possible to configure a table in which the relationships between predetermined repetition factors and transmission methods are defined, and allow the radio base station and the MTC terminal to have this table in advance (see FIG. 7A). Note that, in FIG. 7A, the predetermined repetition factor is 10, but this is by no means limiting. Furthermore, a structure may be used here in which the contents of the table (for example, predetermined repetition factors) are reported from the radio base station to the MTC terminal in advance.

Note that the MTC terminal may select the transmission method for a UL signal depending on the repetition factor of the UL signal. Information about the repetition factor of the UL signal can be reported from the radio base station to the MTC terminal. In this case, the radio base station may report information about the repetition factor of the UL signal and information about the repetition factor of a downlink signal to the MTC terminal together, or separately. Alternatively, a structure may be employed in which the transmission method of a UL signal is made the same as the transmission method of a DL signal regardless of the repetition factors, or directly specified by the radio base station.

In this way, by associating between repetition factors and transmission methods and controlling these, it is possible to carry out communication by selecting adequate transmission methods, when MTC terminals carry out wireless communication. Furthermore, the operation for explicitly reporting information about transmission methods from the radio base station to MTC terminals can be removed.

<MCS>

In communication by MTC terminals, a radio base station and/or an MTC terminal may switch and control the transmission method (frequency hopping/frequency scheduling) depending on the modulation scheme/channel coding rate (MCS: Modulation and Coding Scheme).

MCS refers to the combination of the modulation scheme and the channel coding rate, and a radio base station selects a predetermined MCS (MTC index) based on a channel quality indicator (CQI) that is fed back from an MTC terminal. For example, the radio base station selects a predetermined MTC from a table in which a plurality of MTC indices are defined in advance, based on a CQI that is fed back. Furthermore, information related to the selected MTC can be reported from the radio base station to the MTC terminal.

Usually, when the MCS index is large, the TB (transport block) size is also large, and therefore high throughput can be achieved. On the other hand, MCSs of small indices are used for terminals located in places where the communicating environment is poor (for example, cell edges and so on). For example, when repetition is applied, it may be possible to configure a large repetition factor for an MTC terminal using a small MCS.

According to the present embodiment, when the MCS index is equal to or less than a predetermined value (for example, MCS #0), frequency hopping is employed. On the other hand, when the MCS index is greater than a predetermined value (for example, greater than MCS #0), frequency scheduling is employed.

The radio base station can report the MCS-related information to the MTC terminal by using downlink control information (DCI). The MTC terminal can identify the transmission methods applied to DL signals and/or UL signals based on the MCS index reported from the radio base station.

In this case, it is possible to configure a table in which the relationships between MCS indices and transmission methods are defined, and allow the radio base station and the MTC terminal to have this table in advance (see FIG. 7B). Furthermore, a structure may be used here in which the contents of the table (for example, MCS indices) are reported from the radio base station to the MTC terminal in advance.

In this way, by associating between MCSs and transmission methods and controlling these, it is possible to carry out communication by selecting adequate transmission methods, when MTC terminals carry out wireless communication. Furthermore, the operation for explicitly reporting information about transmission methods from the radio base station to MTC terminals can be removed.

<CQI, RSRP, RSRQ>

In communication by MTC terminals, a radio base station and/or an MTC terminal may switch and control the transmission method (frequency hopping/frequency scheduling) based on at least one of the channel quality indicator (CQI), the received power (RSRP) and the received quality (RSRQ).

The CQI is a channel state indicator, and the MTC terminal estimates the CQI from reference signals (for example, CSI-RS) transmitted from the radio base station, and feeds back the estimated CQI to the radio base station. Furthermore, the RSRP (Reference Signal Received Power) is the received power in the MTC terminal, and the MTC terminal measures the received power based on reference signals (for example, CRS) transmitted from the radio base station, and feeds back the measured received power to the radio base station. The RSRQ (Reference Signal Received Quality) is the received quality in the MTC terminal, and calculated based on the ratio between the received power (RSRP) and the total received power (RSSI: Received Signal Strength Indicator).

For example, the radio base station and/or MTC terminal applies frequency scheduling when the CQI, the RSRP and/or the RSRQ are equal to or greater than a predetermined value (a certain value that is determined on an arbitrary basis), or applies frequency hopping when the CQI, the RSRP and/or the RSRQ are less than the predetermined value. In this case, the transmission method may be determined by using one of the CQI, the RSRP and the RSRQ, or the transmission method may be determined depending on whether or not two or more (for example, the CQI and the RSRP) these become equal to or greater than a predetermined value. Obviously, it is equally possible to determine the transmission method based on whether or not all of the three become equal to or greater than a predetermined value.

The radio base station can determine the transmission methods to apply to DL signals and/or UL signals based on the CQI, the RSRP and/or suchlike information fed back from the MTC terminal. The MTC terminal can determine, autonomously, the transmission methods to apply to DL signals and/or UL signals based on the CQI value and/or the RSRP value measured. Note that the MTC terminal may determine the transmission methods based on information reported from the radio base station.

It is possible to configure a table in which the relationships between the CQI, the RSRP and/or the RSRQ and transmission methods are defined, and allow the radio base station and the MTC terminal to have this table in advance (see FIG. 7C). Note that a structure may be used then in which the contents of the table (for example, CQI, RSRQ and/or RSRQ values) are reported from the radio base station to the MTC terminal in advance.

In this way, by associating between the CQI, the RSRP and/or the RSRQ and transmission methods and controlling these, it is possible to carry out communication by selecting adequate transmission methods, when MTC terminals carry out wireless communication. Furthermore, the operation for explicitly reporting information about transmission methods from the radio base station to MTC terminals can be removed.

Third Example

A case will be described with a third example in which communication is controlled by placing MTC terminals to which frequency hopping is applied and MTC terminals to which frequency scheduling is applied in separate groups.

Figure 8A:
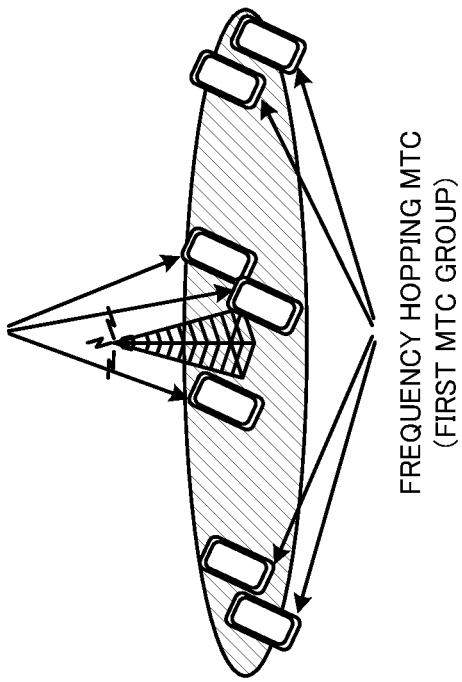
FIG. 8 provide diagrams to show an example of scheduling for groups using different transmission methods.

For example, a radio base station can classify between an MTC terminal group to which frequency hopping is applied (first MTC group) and an MTC group to which frequency scheduling is applied (second MTC group) (see FIG. 8A). For example, the radio base station groups MTC terminals depending on which of frequency hopping and frequency scheduling is applied to DL signals. Alternatively, it is also possible to group MTC terminals depending on which of frequency hopping and frequency scheduling is applied to UL signals.

Figure 8B:
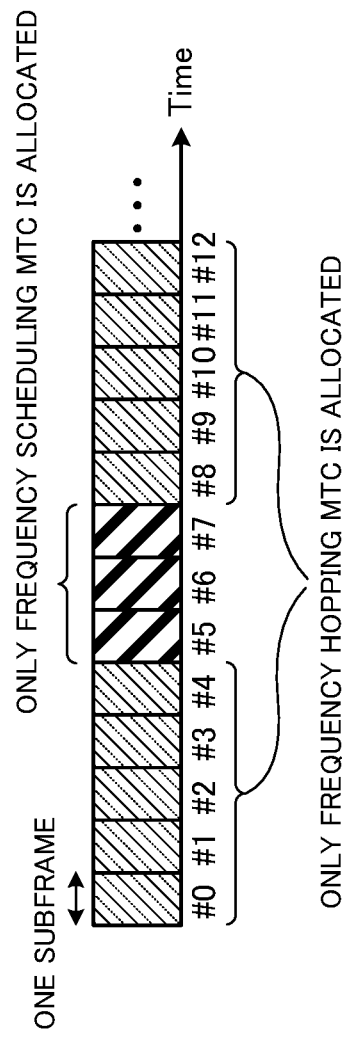

The radio base station can report information about transmission methods on a per MTC terminal basis. Furthermore, the radio base station can command each MTC group to monitor different radio resources (for example, a downlink channel and/or an uplink channel). For example, the radio base station transmits information about subframe patterns and/or frequency resource patterns, which vary per group, to the first MTC group to which frequency hopping is applied, and the second MTC group to which frequency scheduling is applied FIG. 8B shows a case where different subframe patterns are assigned to the first MTC group to which frequency hopping is applied and the second MTC group to which frequency scheduling is applied. Here, subframes #0 to #4 and #8 to #12 are assigned to the first MTC group and subframe #5 to #7 are assigned to the second MTC group.

In this case, the radio base station transmits downlink signals to the MTC terminals classified in the first MTC group, in subframes #0 to #4 and #8 to #12, by applying frequency hopping. Meanwhile, the radio base station transmits downlink signals to the MTC terminals classified in the second MTC group, in subframes #5 to #7, by applying frequency scheduling.

Although FIG. 8B shows a case to assign different subframe patterns to MTC groups that employ different transmission methods, the assignment of frequency resource patterns is by no means limited to this. Furthermore, it is also possible to classify MTC terminals that employ the same transmission method into different groups, and assign different subframe patterns and/or frequency resource patterns.

In this way, by classifying between subframes (or frequency resource) for frequency scheduling and subframes (or frequency resource) for frequency hopping, it is possible to simplify the scheduling in radio base stations and the method of allocation for MTC terminals. Furthermore, MTC terminals do not need to perform the receiving operation by monitoring subframes (frequency resources) to which different transmission methods are applied, so that their power consumption can be reduced.

(Structure of Radio Communication System)

Now, the structure of the radio communication system according to an embodiment of the present invention will be described below. In this radio communication system, the radio communication methods according to the embodiments of the present invention are employed. Note that the radio communication methods of the above-described embodiments may be applied individually or may be applied in combination. Here, although MTC terminals will be shown as examples of user terminals in which the bandwidth to use is limited to reduced bandwidths, the present invention is by no means limited to MTC terminals.

Figure 9:
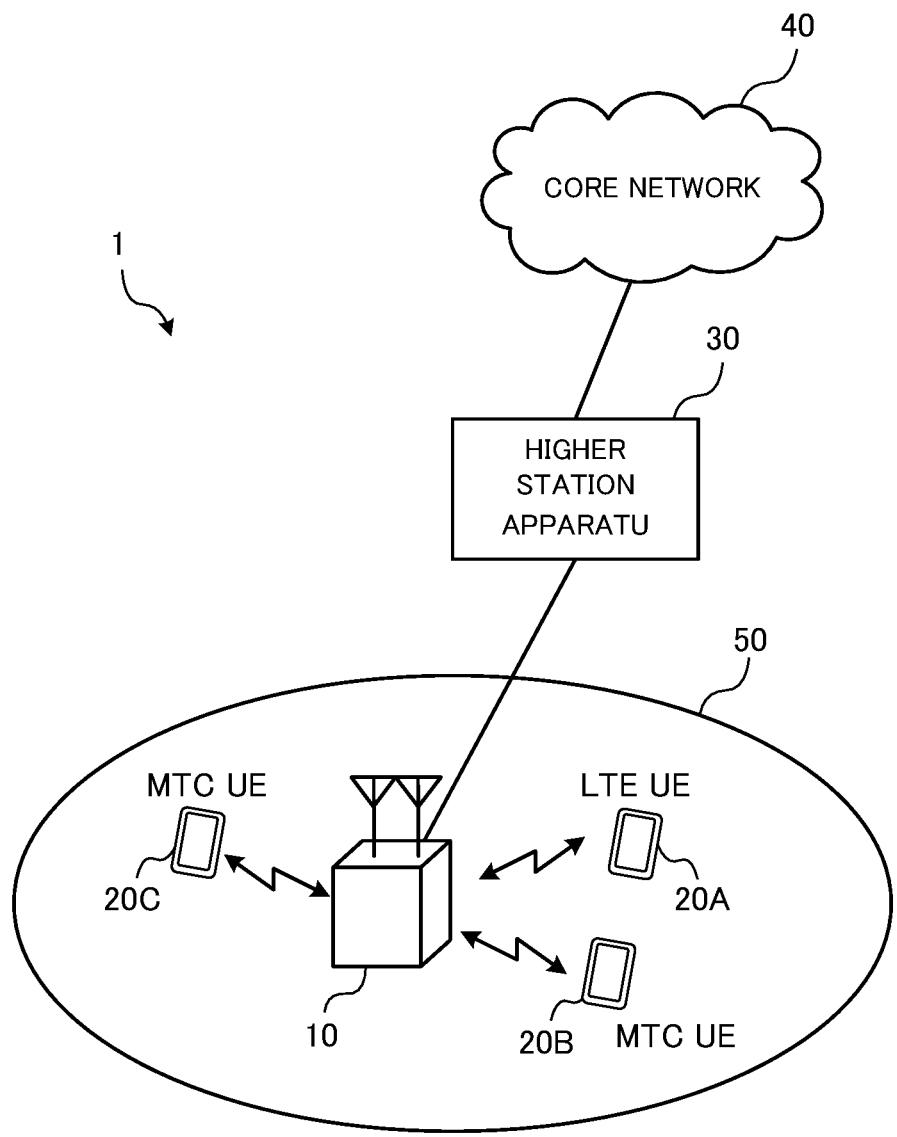
FIG. 9 is a diagram to show a schematic structure of a radio communication system according to an embodiment of the present invention.

FIG. 9 is a diagram to show a schematic structure of the radio communication system according to an embodiment of the present invention. The radio communication system 1 shown in FIG. 9 is an example of employing an LTE system in the network domain of radio communication system. The radio communication system 1 can adopt carrier aggregation (CA) and/or dual connectivity (DC) to group a plurality of fundamental frequency blocks (component carriers) into one, where the LTE system bandwidth constitutes one unit. Also, although, in this LTE system, the system bandwidth is configured to maximum 20 MHz in both the downlink and the uplink, this configuration is by no means limiting. Note that the radio communication system 1 may be referred to as "SUPER 3G," "LTE-A" (LTE-Advanced), "IMT-Advanced," "4G," "5G," "FRA" (Future Radio Access) and so on.

The radio communication system 1 is comprised of a radio base station 10 and a plurality of user terminals 20A, 20B and 20C that are connected with the radio base station 10. The radio base station 10 is connected with a higher station apparatus 30, and connected with a core network 40 via the higher station apparatus 30. Note that the higher station apparatus 30 may be, for example, an access gateway apparatus, a radio network controller (RNC), a mobility management entity (MME) and so on, but is by no means limited to these.

A plurality of user terminal 20A, 20B and 20C can communicate with the radio base station 10 in a cell 50. For example, the user terminal 20A is a user terminal that supports LTE (up to Rel-10) or LTE-Advanced (including Rel-10 and later versions) (hereinafter referred to as an "LTE terminal"), and the other user terminals 20B and 20C are MTC terminals that serve as communication devices in radio communication systems. Hereinafter the user terminals 20A, 20B and 20C will be simply referred to as "user terminals 20," unless specified otherwise.

Note that the MTC terminals 20B and 20C are terminals that support various communication schemes including LTE and LTE-A, and are by no means limited to stationary communication terminals such electric meters, gas meters, vending machines and so on, and can be mobile communication terminals such as vehicles. Furthermore, the user terminals 20 may communicate with other user terminals directly, or communicate with other user terminals via the radio base station 10.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bandwidths formed with one or continuous resource blocks per terminal, and allowing a plurality of terminals to use mutually different bandwidths. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and predetermined SIBs (System Information Blocks) are communicated in the PDSCH. Also, the MIB (Master Information Block) and so on are communicated by the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ delivery acknowledgement signals (ACKs/NACKs) in response to the PUSCH are communicated by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data and higher layer control information are communicated by the PUSCH. Also, downlink radio quality information (CQI: Channel Quality Indicator), delivery acknowledgement signals and so on are communicated by the PUCCH. By means of the PRACH, random access preambles (RA preambles) for establishing connections with cells are communicated.

Figure 10:
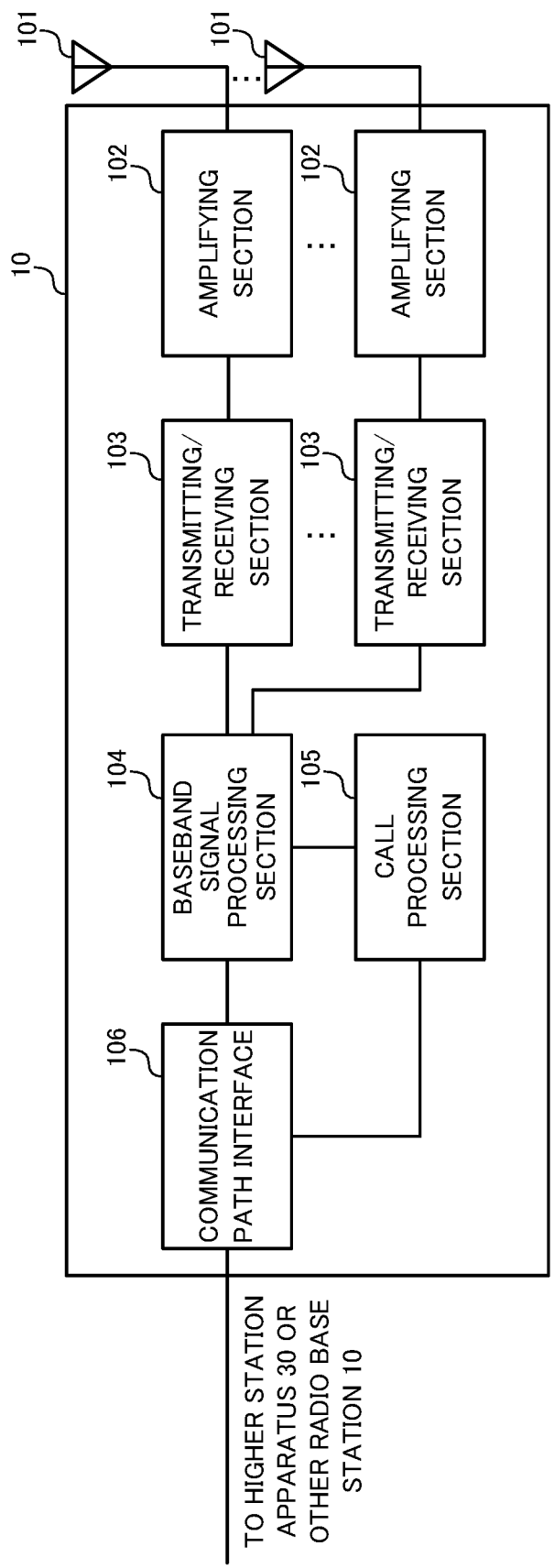
FIG. 10 is a diagram to show an example of an overall structure of a radio base station according to an embodiment of the present invention.

FIG. 10 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that the transmitting/receiving sections 103 are comprised of transmitting sections and receiving sections.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Each transmitting/receiving section 103 converts baseband signals that are pre-coded and output from the baseband signal processing section 104 on a per antenna basis, into a radio frequency bandwidth. The radio frequency signals having been subjected to frequency conversion in the transmitting/receiving sections 103 are amplified in the amplifying sections 102, and transmitted from the transmitting/receiving antennas 101. The transmitting/receiving sections 103 can transmit and/or receive various signals in a reduced bandwidth (for example, 1.4 MHz) that is more limited than a system bandwidth (for example, one component carrier).

The transmitting/receiving sections 103 can transmit downlink signals by switching the transmission method (between frequency hopping and frequency scheduling). Furthermore, the transmitting/receiving section 103 can report information about the transmission method to apply to downlink signals to the user terminals. In this case, the transmitting/receiving sections 103 may report information about the transmission method to each user terminal, separately, by using a downlink control signal and/or higher layer signaling, or report information about the same transmission method to the user terminals in the cell.

For the transmitting/receiving sections 103, transmitters/receivers, transmitting/receiving circuits or transmitting/receiving devices that can be described based on common understanding of the technical field to which the present invention pertains can be used.

Meanwhile, as for uplink signals, radio frequency signals that are received in the transmitting/receiving antennas 101 are each amplified in the amplifying sections 102. Each transmitting/receiving section 103 receives uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. The communication path interface 106 transmits and receives signals to and from neighboring radio base stations 10 (backhaul signaling) via an inter-base station interface (for example, optical fiber, the X2 interface, etc.).

Figure 11:
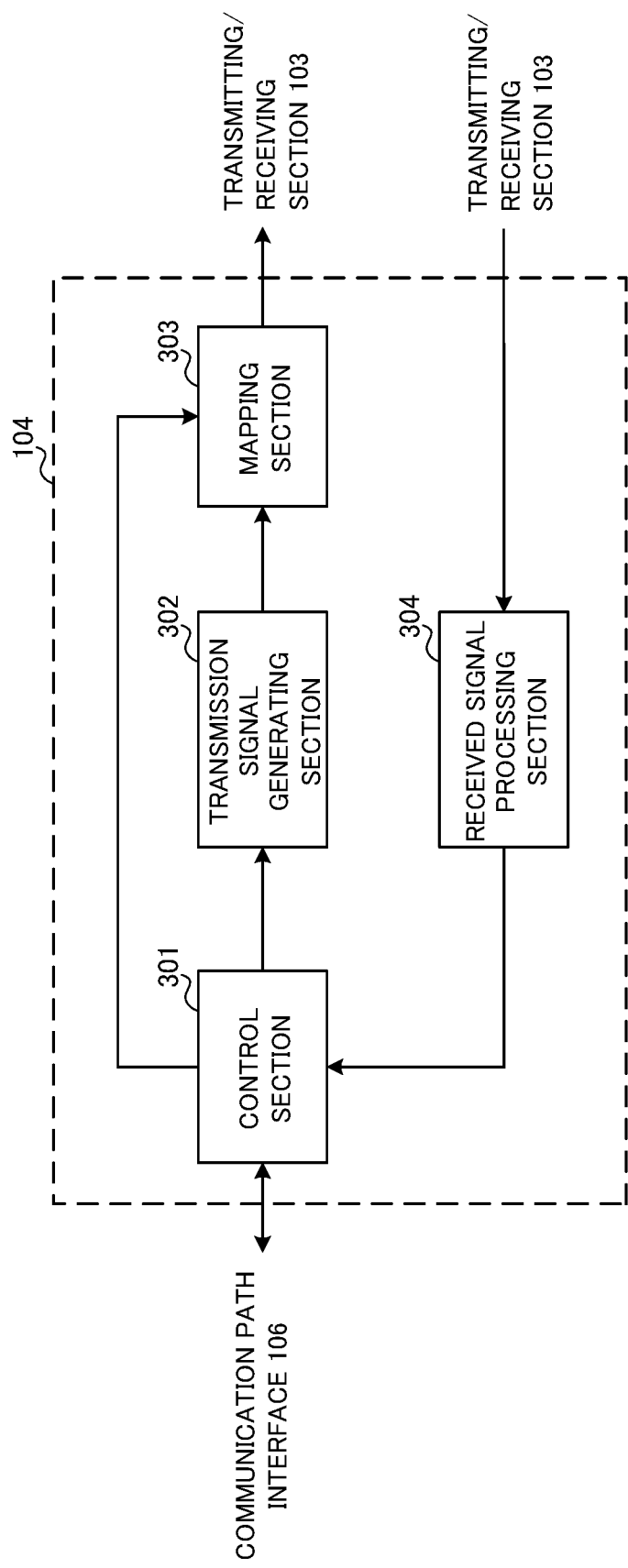
FIG. 11 is a diagram to show an example of a functional structure of a radio base station according to one embodiment of the present invention.

FIG. 11 is a diagram to show an example of a functional structure of a radio base station according to the present embodiment. Note that, although FIG. 11 primarily shows functional blocks that pertain to characteristic parts of the present embodiment, the radio base station 10 has other functional blocks that are necessary for radio communication as well. As shown in FIG. 11, the baseband signal processing section 104 has a control section (scheduler) 301, a transmission signal generating section (generation section) 302, a mapping section 303 and a received signal processing section 304.

The control section (scheduler) 301 controls the scheduling of (for example, allocates resources to) downlink data signals that are transmitted in the PDSCH and downlink control signals that are communicated in the PDCCH and/or the EPDCCH. Also, the control section 301 controls the scheduling of downlink reference signals such as system information, synchronization signals, CRSs (Cell-specific Reference Signals), CSI-RSs (Channel State Information Reference Signals) and so on. Also, the control section 301 controls the scheduling of uplink reference signals, uplink data signals that are transmitted in the PUSCH, uplink control signals that are transmitted in the PUCCH and/or the PUSCH, random access preambles that are transmitted in the PRACH, and so on.

The control section 301 controls the transmission signal generating section 302 and the mapping section 303 to allocate various signals to reduced bandwidths and transmit these to the user terminals 20. For example, the control section 301 controls downlink system information (the MIB, SIBs, etc.) and EPDCCHs to be allocated to reduced bandwidths.

Also, the control section 301 transmits PDSCHs to the user terminals 20 in predetermined reduced bandwidths. Note that, when the radio base station 10 employs coverage enhancement, for example, the control section 301 may configure a repetition factor for a DL signal for a predetermined user terminal 20, and repeat transmitting the DL signal based on this repetition factor. Furthermore, the control section 301 may control this repetition factor to be reported to the user terminal 20 in a control signal (DCI) in the EPDCCH or by using higher layer signaling (for example, RRC signaling, broadcast information, etc.).

Furthermore, the control section 301 can control transmission by applying a transmission method (one of the transmission method to use frequency hopping and the transmission method to use frequency scheduling) to downlink signals based on predetermined conditions. For example, the control section 301 can switch and apply the transmission method based on the number of times transmission is repeated. Alternatively, the control section 301 can switch and apply the transmission method based on at least one of the modulation scheme/channel coding rate (MCS: Modulation and Coding Scheme), the channel quality indicator (CQI), the received power (RSRP) and the received quality (RSRQ).

Furthermore, when the control section 301 applies the transmission method to use frequency hopping to downlink signals, the control section 301 can exert control so that different hopping patterns are applied to a plurality of user terminals. In this case, it is possible transmit, to the user terminals, hopping pattern information that is associated with the user IDs.

Furthermore, the control section 301 can exert control so that, when there are group of user terminals to which the transmission method to use frequency hopping is applied, and a group of user terminals to which the transmission method to use frequency scheduling is applied, different subframe patterns and/or frequency resource patterns are configured on a per group basis.

Furthermore, if a repetition factor for a UL signal (for example, the PUCCH and/or the PUSCH) is configured in the user terminal 20, the control section 301 may exert control so that information about the repetition factor is included in DCI and/or the like, and transmitted to the user terminal 20.

For the control section 301, a controller, a control circuit or a control device that can be described based on common understanding of the technical field to which the present invention pertains can be used.

The transmission signal generating section 302 generates DL signals based on commands from the control section 301 and outputs these signals to the mapping section 303. For example, the transmission signal generating section 302 generates DL assignments, which report downlink signal allocation information, and UL grants, which report uplink signal allocation information, based on commands from the control section 301. Also, the downlink data signals are subjected to a coding process and a modulation process, based on coding rates and modulation schemes that are determined based on channel state information (CSI) from each user terminal 20 and so on.

Also, when repetitious DL signal transmission (for example, repetitious PDSCH transmission) is configured, the transmission signal generating section 302 generates the same DL signal over a plurality of subframes and outputs these signals to the mapping section 303.

For the transmission signal generating section 302, a signal generator, a signal generating circuit or a signal generating device that can be described based on common understanding of the technical field to which the present invention pertains can be used.

The mapping section 303 maps the downlink signals generated in the transmission signal generating section 302 to predetermined reduced bandwidth radio resources (for example, maximum 6 resource blocks) based on commands from the control section 301, and outputs these to the transmitting/receiving sections 103.

For the mapping section 303, mapper, a mapping circuit or a mapping device that can be described based on common understanding of the technical field to which the present invention pertains can be used.

The received signal processing section 304 performs the receiving processes (for example, demapping, demodulation, decoding and so on) of the UL signals that are transmitted from the user terminals (for example, delivery acknowledgement signals (HARQ-ACKs), data signals that are transmitted in the PUSCH, random access preambles that are transmitted in the PRACH, and so on). The processing results are output to the control section 301.

Also, by using the received signals, the received signal processing section 304 may measure the received power (for example, RSRP (Reference Signal Received Power)), the received quality (for example, RSRQ (Reference Signal Received Quality)), channel states and so on. The measurement results may be output to the control section 301.

The receiving process section 304 can be constituted by a signal processor, a signal processing circuit or a signal processing device, and a measurer, a measurement circuit or a measurement device that can be described based on common understanding of the technical field to which the present invention pertains.

Figure 12:
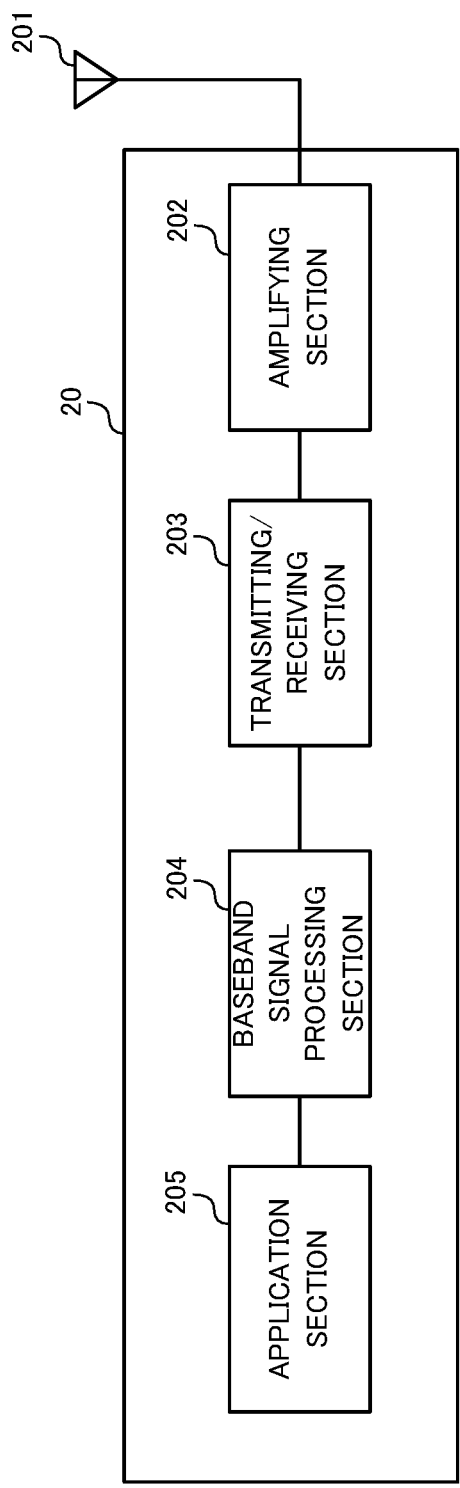
FIG. 12 is a diagram to show an example of an overall structure of a user terminal according to an embodiment of the present invention.

FIG. 12 is a diagram to show an example of an overall structure of a user terminal according to the present embodiment. Note that, although not described in detail herein, normal LTE terminals may operate to act as MTC terminals. A user terminal 20 has a transmitting/receiving antenna 201, an amplifying section 202, a transmitting/receiving section 203, a baseband signal processing section 204 and an application section 205. Note that the transmitting/receiving section 203 is comprised of a transmitting section and a receiving section. Also, the user terminal 20 may have a plurality of transmitting/receiving antennas 201, amplifying sections 202, transmitting/receiving sections 203 and so on.

A radio frequency signal that is received in the transmitting/receiving antenna 201 is amplified in the amplifying section 202. The transmitting/receiving section 203 receives the downlink signal amplified in the amplifying section 202. The received signal is subjected to frequency conversion and converted into the baseband signal in the transmitting/receiving section 203, and output to the baseband signal processing section 204.

For the transmitting/receiving section 203, a transmitters/receiver, a transmitting/receiving circuit or a transmitting/receiving device that can be described based on common understanding of the technical field to which the present invention pertains can be used.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to each transmitting/receiving section 203. The baseband signal that is output from the baseband signal processing section 204 is converted into a radio frequency bandwidth in the transmitting/receiving section 203. The radio frequency signal that is subjected to frequency conversion in the transmitting/receiving section 203 is amplified in the amplifying section 202, and transmitted from the transmitting/receiving antenna 201.

Figure 13:
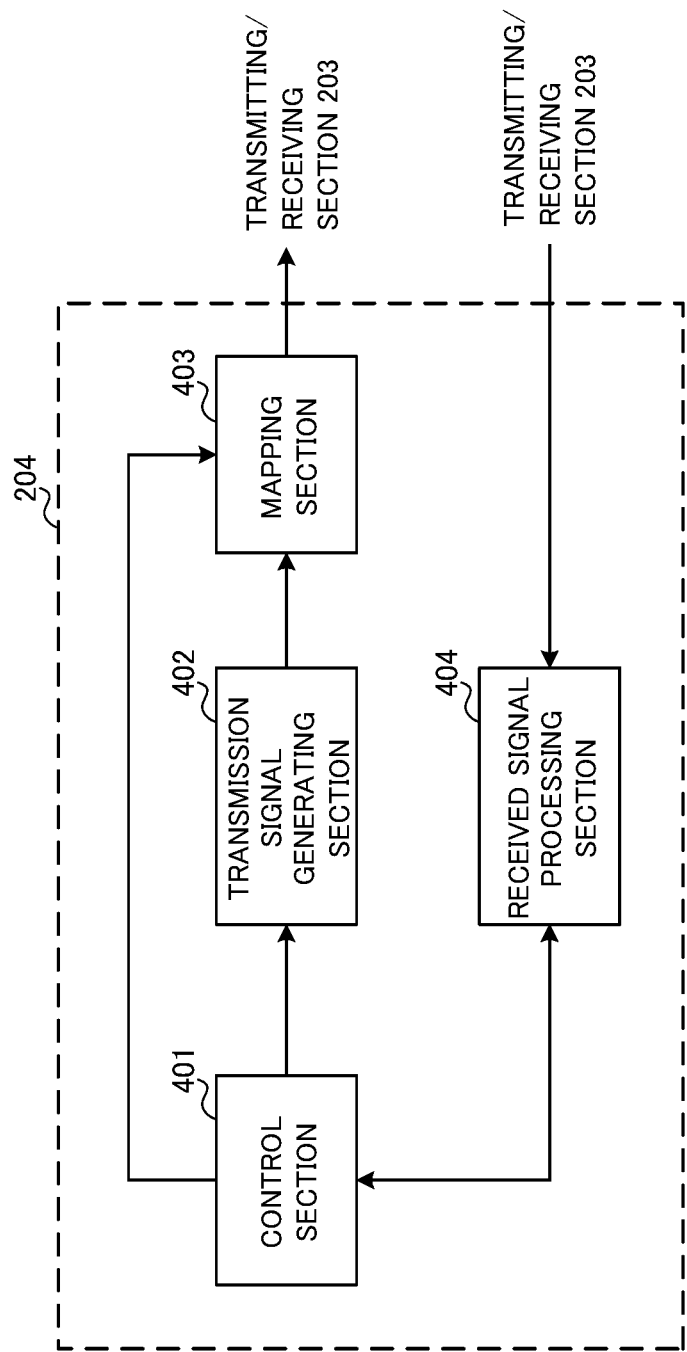
FIG. 13 is a diagram to show an example of a functional structure of a user terminal according to an embodiment of the present invention.

FIG. 13 is a diagram to show an example of a functional structure of a user terminal according to the present embodiment. Note that, although FIG. 13 primarily shows functional blocks that pertain to characteristic parts of the present embodiment, the user terminal 20 has other functional blocks that are necessary for radio communication as well. As shown in FIG. 13, the baseband signal processing section 204 provided in the user terminal 20 has a control section 401, a transmission signal generating section 402, a mapping section 403 and a received signal processing section 404.

The control section 401 acquires the downlink control signals (signals transmitted in the PDCCH/EPDCCH) and downlink data signals (signals transmitted in the PDSCH) transmitted from the radio base station 10, from the received signal processing section 404. The control section 401 controls the generation of uplink control signals (for example, delivery acknowledgement signals (HARQ-ACKs) and so on) and uplink data signals based on the downlink control signals, the results of deciding whether or not re transmission control is necessary for the downlink data signals, and so on. To be more specific, the control section 401 controls the transmission signal generating section 402 and the mapping section 403.

Also, the control section 401 determines the PUCCH resources in predetermined subframes, controls the timings (subframes) to transmit PUCCHs, and so on.

Furthermore, when a repetition factor for a UL signal (for example, the PUCCH and/or the PUSCH) is configured in a user terminal 20, the control section 401 may control the user terminal 20 to increase and decrease the number of times to repeat transmitting the PUCCH and/or the PUSCH based on information about the repetition factor that is received from the radio base station 10.

Furthermore, the control section 301 can control transmission by applying a transmission method (one of the transmission method to use frequency hopping and the transmission method to use frequency scheduling) to uplink signals based on predetermined conditions. For example, the control section 301 can switch and apply the transmission method based on the number of times transmission is repeated. Alternatively, the control section 301 can switch and apply the transmission method based on at least one of the modulation scheme/channel coding rate (MCS: Modulation and Coding Scheme), the channel quality indicator (CQI), the received power (RSRP) and the received quality (RSRQ).

Furthermore, when the control section 401 applies the transmission method to use frequency hopping to uplink signals, the control section 401 can exert control so that different hopping patterns are applied to a plurality of user terminals. For example, the control section 401 can apply the hopping patterns that are associated with the user IDs.

For the control section 401, a controller, a control circuit or a control device that can be described based on common understanding of the technical field to which the present invention pertains can be used.

The transmission signal generating section 402 generates UL signals based on commands from the control section 401, and outputs these signals to the mapping section 403. For example, the transmission signal generating section 402 generates uplink control signals such as delivery acknowledgement signals (HARQ-ACKs), channel state information (CSI) and so on, based on commands from the control section 401. Also, the transmission signal generating section 402 generates uplink data signals based on commands from the control section 401. For example, when a UL grant is included in a downlink control signal that is reported from the radio base station 10, the control section 401 commands the transmission signal generating section 402 to generate an uplink data signal.

Furthermore, when repetitious UL signal transmission (for example, repetitious PUCCH and/or PUSCH transmission) is configured, the transmission signal generating section 402 generates the same UL signal over a plurality of subframes and outputs these signals to the mapping section 403. The repetition factor may be increased and/or decreased based on commands from the control section 401.

For the transmission signal generating section 402, a signal generator, a signal generating circuit or a signal generating device that can be described based on common understanding of the technical field to which the present invention pertains can be used.

The mapping section 403 maps the uplink signals generated in the transmission signal generating section 402 to radio resources (maximum 6 resource blocks) based on commands from the control section 401, and output these to the transmitting/receiving sections 203.

For the mapping section 403, mapper, a mapping circuit or a mapping device that can be described based on common understanding of the technical field to which the present invention pertains can be used.

The received signal processing section 404 performs receiving processes (for example, demapping, demodulation, decoding and so on) of DL signals (for example, downlink control signals transmitted from the radio base station, downlink data signals transmitted in the PDSCH, and so on). Note that the received signal processing section 404 performs receiving processes in accordance with the transmission method applied to the downlink signals.

The received signal processing section 404 outputs the information received from the radio base station 10, to the control section 401. The received signal processing section 404 outputs, for example, broadcast information, system information, RRC signaling, DCI and so on, to the control section 401. Also, the received signal processing section 404 may measure the received power (RSRP), the received quality (RSRQ) and channel states, by using the received signals. Note that the measurement results may be output to the control section 401.

The received signal processing section 404 can be constituted by a signal processor, a signal processing circuit or a signal processing device, and a measurer, a measurement circuit or a measurement device that can be described based on common understanding of the technical field to which the present invention pertains. Also, the received signal processing section 404 can constitute the receiving section according to the present invention.

Note that the block diagrams that have been used to describe the above embodiments show blocks in functional units. These functional blocks (components) may be implemented in arbitrary combinations of hardware and software. Also, the means for implementing each functional block is not particularly limited. That is, each functional block may be implemented with one physically-integrated device, or may be implemented by connecting two physically-separate devices via radio or wire and using these multiple devices.

For example, part or all of the functions of radio base stations 10 and user terminals 20 may be implemented using hardware such as an ASIC (Application-Specific Integrated Circuit), a PLD (Programmable Logic Devices), an FPGA (Field Programmable Gate Arrays) and so on. Also, the radio base stations 10 and user terminals 20 may be implemented with a computer device that includes a processor (CPU), a communication interface for connecting with networks, a memory and a computer-readable storage medium that holds programs.

Here, the processor and the memory are connected with a bus for communicating information. Also, the computer-readable recording medium is a storage medium such as, for example, a flexible disk, an opto-magnetic disk, a ROM, an EPROM, a CD-ROM, a RAM, a hard disk and so on. Also, the programs may be transmitted from the network through, for example, electric communication channels. Also, the radio base stations 10 and user terminals 20 may include input devices such as input keys and output devices such as displays.

The functional structures of the radio base stations 10 and user terminals 20 may be implemented with the above-described hardware, may be implemented with software modules that are executed on the processor, or may be implemented with combinations of both. The processor controls the whole of the user terminals by running an operating system. Also, the processor reads programs, software modules and data from the storage medium into the memory, and executes various types of processes. Here, these programs have only to be programs that make a computer execute each operation that has been described with the above embodiments. For example, the control section 401 of the user terminals 20 may be stored in the memory and implemented by a control program that operates on the processor, and other functional blocks may be implemented likewise.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining example s, and should by no means be construed to limit the present invention in any way.

The disclosure of Japanese Patent Application No. 2015-015794, filed on Jan. 29, 2015, including the specification, drawings and abstract, is incorporated herein by reference in its entirety.

The invention claimed is:

1. A radio base station that communicates with a user terminal in which a bandwidth to use is limited to a partial reduced bandwidth in a system bandwidth, the radio base station comprising:
    a transmitter that transmits a downlink signal to the user terminal in repetitions; and
    a processor that controls transmission by selecting between a transmission method that uses frequency hopping and a transmission method that uses a same frequency resource when transmitting the repetitions without using the frequency hopping to apply to the downlink signal,
    wherein the transmitter transmits information about the transmission method to apply to the downlink signal to the user terminal.

2. The radio base station according to claim 1, wherein the transmitter reports the information about the transmission method to the user terminal by using a downlink control signal and/or higher layer signaling.

3. The radio base station according to claim 2, wherein transmission method that uses the same resource without using the frequency hopping is a transmission method that uses frequency scheduling.

4. The radio base station according to claim 1, wherein the transmission method that uses the same resource without using the frequency hopping is a transmission method that uses frequency scheduling.

5. A radio communication method for allowing a radio base station to communicate with a user terminal, in which a bandwidth to use is limited to a partial reduced bandwidth in a system bandwidth, the radio communication method comprising:
 controlling transmission of a downlink signal by selecting between a transmission method that uses frequency hopping and a transmission method that uses a same frequency resource when transmitting repetitions without using the frequency hopping to apply to the downlink signal;
 transmitting information about the transmission method to apply to the downlink signal to the user terminal; and
 transmitting the downlink signal to the user terminal in the repetitions.

6. The radio communication method according to claim 5, wherein the transmission method that uses the same resource without using the frequency hopping is a transmission method that uses frequency scheduling.

7. A user terminal, in which a bandwidth to use is limited to a partial reduced bandwidth in a system bandwidth, the user terminal comprising:
 a transmitter that transmits an uplink signal to a radio base station in repetitions; and
 a processor that controls transmission by selecting between a transmission method that uses frequency hopping and a transmission method that uses a same frequency resource when transmitting the repetitions without using the frequency hopping to apply to the uplink signal,
 wherein the processor determines the transmission method to apply to the uplink signal based on given information transmitted from the radio base station.

8. The user terminal according to claim 7, further comprising a receiver that receives the given information from a downlink control signal and/or higher layer signaling.

9. The user terminal according to claim 8, wherein the transmission method that uses the same resource without using the frequency hopping is a transmission method that uses frequency scheduling.

10. The user terminal according to claim 7, wherein the transmission method that uses the same resource without using the frequency hopping is a transmission method that uses frequency scheduling.

* * * * *